United States Patent [19]

Cash et al.

[11] Patent Number: 4,887,233

[45] Date of Patent: Dec. 12, 1989

[54] PIPELINE ARITHMETIC ADDER AND MULTIPLIER

[75] Inventors: Glenn L. Cash, Matawan; Mehdi Hatamian, Oldbridge; Adrianus Ligtenberg, Rumson, all of N.J.

[73] Assignee: American Telephone and Telegraph Company, AT&T Bell Laboratories, Murray Hill, N.J.

[21] Appl. No.: 846,145

[22] Filed: Mar. 31, 1986

[51] Int. Cl.[4] ............................ G06F 7/52; G06F 7/50
[52] U.S. Cl. ..................................... 364/757; 364/784; 364/750.5
[58] Field of Search ........................ 364/754, 757–760, 364/768, 784, 786, 750.5

[56] References Cited

U.S. PATENT DOCUMENTS

| | | | |
|---|---|---|---|
| 3,752,971 | 8/1973 | Calhoun et al. | 364/758 |
| 3,900,724 | 8/1975 | McIver et al. | 364/758 |
| 4,130,878 | 12/1978 | Balph et al. | 364/758 |
| 4,432,066 | 2/1984 | Benschop | 364/758 |
| 4,441,158 | 4/1984 | Kanuma | 364/757 |
| 4,495,593 | 1/1985 | Ware | 364/757 |
| 4,533,993 | 8/1985 | McCanny et al. | 364/200 |
| 4,571,701 | 2/1986 | Rerouge | 364/757 |
| 4,594,678 | 6/1986 | Uhlenhoff | 364/758 |
| 4,611,305 | 9/1986 | Iwase | 364/736 |
| 4,616,330 | 10/1986 | Betz | 364/750.5 |
| 4,638,449 | 1/1987 | Frey | 364/760 |
| 4,683,548 | 7/1987 | Mlynek | 364/786 |
| 4,736,335 | 4/1985 | Barkan | 364/758 |
| 4,748,583 | 5/1988 | Noll | 364/758 |
| 4,748,584 | 5/1988 | Noda | 364/760 |

FOREIGN PATENT DOCUMENTS

| | | | |
|---|---|---|---|
| 0144260 | 8/1983 | Japan | 364/757 |
| 0045842 | 3/1985 | Japan | 364/757 |

OTHER PUBLICATIONS

Hallin et al, "Pipelining of Arithmetic Functions", *IEEE Proc. on Computers*, Aug. 1972, pp. 880–886.

*Principles of CMOS VLSI Design, A Systems Perspective*, Addison Wesley, FIGS. 8.4, 8.12 and others.

C. R. Baugh et al, "A Two's Complement Parallel Array Multiplication Algorithm", *IEEE Transactions on Computers*, vol. C-22, No. 12, Dec. 1973, pp. 1045–1047.

*Primary Examiner*—Emanuel S. Kemeny
*Assistant Examiner*—Dale M. Shaw
*Attorney, Agent, or Firm*—Henry T. Brendzel

[57] ABSTRACT

A fast pipeline adder comprising a plurality of registered adder rows. In one embodiment, additions in the pipeline are realized in reclocked half adders. In another embodiment, modified adders are employed which accept two carry inputs and develop two carry outputs. The resulting number of individual cells is reduced to approximately half of those in the prior embodiment. In still another embodiment, switch means are included in each cell to delete the reclocking and in still another embodiment, the adders in the diagonal of the pipeline adder are provided with additional inputs to permit use of the pipeline adder in recursive addition applications. In still another embodiment, the cells are permitted to output the inverse of the intended signal, reducing thereby the physical realization of the cells and increasing the speed of the cells.

22 Claims, 4 Drawing Sheets

PIPELINE ARITHMETIC ADDER AND MULTIPLIER

BACKGROUND OF THE INVENTION

This invention relates to pipeline arithmetic units and, more particularly, to a pipeline adder that employs half adders to achieve high throughput.

Some prior art designs of data processing circuits in VLSI still employ the relatively random constructions used in smaller scale integration and in hybrid circuits. Such approaches tend to produce circuits consisting of blocks that perform a particular function well, but the various blocks are different. In spite of the ability to create a large number of transistors within a single VLSI circuit, the temptation is to minimize the number of transistors required for the implementation of each function, so as to maximize the overall functionality of the integrated circuit. Such circuits are difficult to design and test. In addition, such circuits sometimes result in long conducting interconnections which increase stray capacitances and reduce the potential switching speed of the circuit. Perhaps even more importantly, such circuits often have conducting paths of greatly differing lengths and that complicates design of the synchronization circuitry because the varying propagation delays must be accounted for. More recently, VLSI designs have turned more to systematic, modular, designs of the building blocks comprising the integrated circuits but that, per se, does not eliminate design failings that reduce the circuit's maximum operating speed.

Prior art multiplication techniques, for example, have employed the highly modular Carry Save Addition (CSA) technique which comprises rows of adders. In each row of adders an incoming partial product is added to the sum and carry outputs of the previous row. No horizontal connections exist between the adders in each row except for the last row where the carry signal has to propagate horizontally through all the adders cells on that row. Only when this rippling-through has been accomplished is the multiplication product valid.

The overall delay through a multiplier employing CSAs is the ripple-through delay of the last row plus the sum of the delays through one stage in each row. Thus, with a multiplicand of N bits and a multiplier of M bits, the overall delay is approximately M+N times the delay through a single adder cell. Most of the adder cells, by the way, are full adders.

As can be appreciated from the above, ripple through designs carry time penalties because of the need to wait for the rippling-through of carry signals at each stage of the multiplication.

To alleviate these time penalties, "pipelining" has been introduced. In such a design, each cell is a full adder that accepts three bits: a sum bit from the previous row, a partial product bit, and a carry bit from the previous row. Latches are introduced between successive rows, and these latches permit the pipelining of multiplication operations. What that means is that while a partial sum of one multiplication operation is developed in one row based on information stored in latches of the previous row, that previous row may be computing a partial sum of a successive multiplication operation. The technique of placing latches between successive cell rows increases the time between the beginning of the multiplication operation and its completion (latency), but it greatly increases the rate at which successive products appear at the output (throughput).

The problem with prior art pipeline multipliers, however, is that at the last multiplication stage, a carry signal must propagate as described above. That propagation delay becomes the weak link in the circuit's operating speed capability. To overcome the propagation delay in the last adder stage, some artisans have sacrificed simplicity for speed by introducing carry look-ahead adders in the last stage. Look-ahead adders, however, grow in size and complexity with the size of the multiplicand, their implementation does not lend itself to a regular geometric structure, and the delay of even the most efficient look-ahead adder is still greater than the delay of a single adder stage.

It is an object of this invention, therefore, to provide a pipeline adder that avoids ripple-through carry delays and also avoids the pitfalls of look-ahead adders. It is another object of this invention to provide a pipeline adder which may be employed within VLSI designs implementing more complex arithmetic, such as pipeline multipliers.

SUMMARY OF THE INVENTION

These and other advantages are realized in a pipeline adder comprising a plurality of pipeline adder rows. In one embodiment, the additions in the pipeline are realized in 1-bit registered half adders. The number of half adder stages in the first row is equal to the number of bits in the incoming binary words to be added (or in the final sum to be evaluated from a partial sum and its associated carry bits). In each successive row, one least significant bit registered half adder is replaced with a 1-bit register until no adders are left. Thus, the number of rows is equal to the number of half adders in the first row. In another embodiment, modified adders are employed which accept two carry inputs and develop two carry outputs. The resulting number of individual cells is reduced to approximately half of those in the aforementioned embodiment. In still another embodiment, switch means are included in each cell to delete the reclocking; and in yet another embodiment, the adders in the diagonal of the pipeline adder are provided with additional inputs to permit use of the pipeline adder in recursive addition applications. In still another embodiment, the cells develop the inverse of the intended signal, reducing thereby the physical realization of the cells and increasing the speed of the cells.

DETAILED DESCRIPTION

Figure 1:
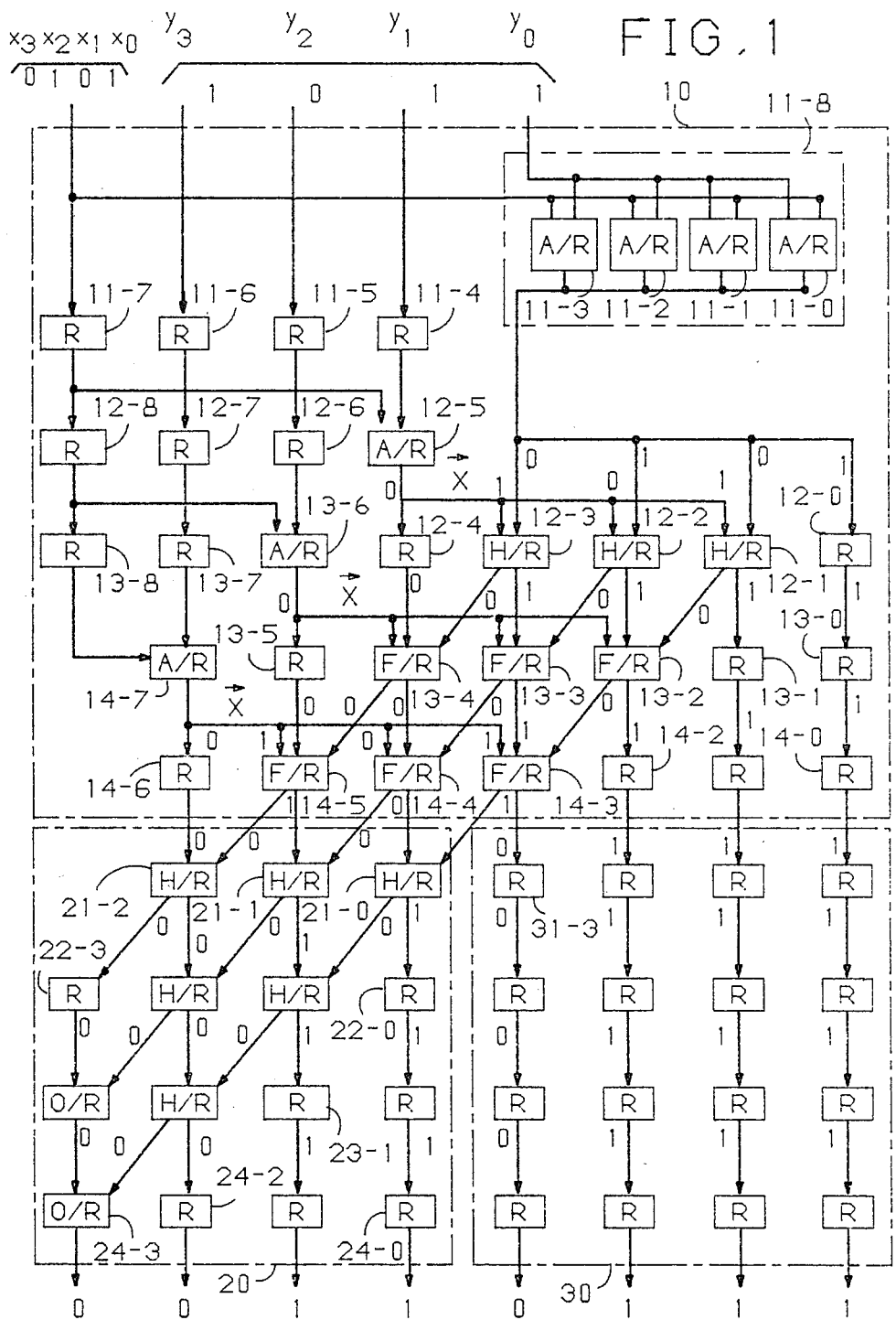
FIG. 1 depicts a pipeline multiplier employing a pipeline adder in conformance with the principles of this invention.

FIG. 1 depicts a 4-bit pipelined multiplier design employing a pipelined adder stage in accordance with the principles of this invention. It comprises a pipelined para-multiplication subsection 10, a pipelined adder subsection 20, and a synchronization registers subsection 30. Subsection 10 is referred to as a para-multiplication subsection because it performs a portion of the multiplication process, as described more fully below. The subsections are made up of four basic cells: A/R cells, having an AND gate followed by a 1-bit register, (such as cell 11-0); R cells, having merely a 1-bit register, (such as cell 12-0); H/R cells, having a half adder followed by a 1-bit register (such as cell 12-1); F/R cells, having a full adder followed by a 1-bit register (such as cell 13-2); and O/R cells having an OR gate followed by a 1-bit register (such as cell 24-3).

Subsection 10 in FIG. 1 contains three rows; one less than the number of bits in the multiplier. The input to the first row is the multiplicand gated with the least significant bit of the multiplier ($y_0$) and the multiplicand delayed and gated with the following bit of the multiplier ($y_1$). The gating is done in elements comprising four A/R cells, as depicted by element 11-8. Element 11-8 contains A/R cells 11-0 through 11-3 which are responsive to the least significant bit of the multiplier ($y_0$). Each of the cells is also responsive to a different bit of the multiplicand, $\bar{x}$. Specifically, A/R cell 11-0 is responsive to the least significant bit of the multiplicand ($x_0$), A/R cell 11-1 is responsive to the next least significant bit of the multiplicand ($x_1$), and so on, terminating with A/R cell 11-3 which is responsive to the most significant bit of the multiplicand ($x_3$). Each cell in element 11-8 develops a single output which is applied to one input of a corresponding cell in the first row. Element 12-5, as well as elements 13-6 and 14-7 are identical to element 11-8.

The first row in subsection 10 begins with R cell 12-0 in the least significant bit position, followed by H/R cells 12-1 through 12-3. The most significant bit position contains an R cell 12-4. Cells 12-1 through 12-4 are responsive to a replica of the multiplicand $\bar{x}$ element 12-5 which is gated through with the second least significant bit of the multiplier ($y_1$) that is delayed by R cell 11-4. The delay in $\bar{x}$ and $y_1$ synchronizes the output of element 12-5 with the output of cells 11-0 through 11-3. Cells 12-0 through 12-3 yield a partial sum that is applied to the second row in FIG. 1.

The first row of subsection 10 is different in structure from succeeding rows, because at start-up there is no partial sum and, consequently, two gated replias of the multiplicand can be combined in one row. The second and succeeding rows have a number of R cells at the least significant end of the row, one R cell at the most significant end of the row, and F/R cells therebetween. The number of low significant bit R cells is K-1, where K is the row number, and the number of F/R cells is M-1, where M is the number of multiplicand bits. Each of the low significant bit R cells is connected to the output of a corresponding (i.e., in the same column) R cell in the previous row or to the sum output of a corresponding adder in the previous row, as the case may be. For example, cell 13-0 is connected to the output of R cell 12-0, while cell 13-1 is connected to the sum output of H/R cell 12-1. Each of the F/R cells is connected to a multiplicand bit that is appropriately delayed (through K, R cells) and gated with a corresponding multiplier bit. Each F/R cell is further responsive to the sum output of a corresponding adder (i.e., in the same column) cell in the previous row, and still further responsive to the carry output of an adder in the previous row that is 1-bit lower in significance. For example, F/R cell 13-2 is responsive to the sum output of H/R cell 12-2, to the carry output of H/R cell 12-1 and to $x_0 \cdot y_2$ obtained from the four A/R cell element 13-6. The input to element 13-6 is obtained by delaying the corresponding multiplier bit ($y_2$) through K cells (11-5 and 12-6) and by delaying the multiplicand (x) by an equal amount (elements 11-7 and 12-8).

Subsection 30 in FIG. 1 includes only R cells, arranged in rows and columns. The number of R cells in each row is M, and there are M rows. Each R cell in a row is connected to an R cell in the previous row and in the same column. Subsection 30 is connected to the M least significant bits of the output developed by subsection 10. Its function is to appropriately delay those output bits of subsection 10, which are the least significant bits of the final product, until the carry signals are accommodated by subsection 20.

Subsection 20 is the adder employing the pipeline principles of this invention. Like subsection 30, subsection 20 is arranged in M rows and M columns. The first row of subsection 20 contains M-1 H/R cells, 22-0 through 21-2. The least significant H/R cell (21-0) is connected to the carry output of the least significant F/R cell in the last row of subsection 10 (cell 14-3) and to the sum output of the following F/R cell in the same row (cell 14-4). Higher significance H/R cells in the first row of subsection 20 are correspondingly connected to higher significance cells in the last row of subsection 10. There are only M-1 cells in the first row of subsection 20 because the last cell in the last row of subsection 10 is an R cell that develops no carry output.

The second row in subsection 20 has an R cell in its least significant position ((22-0), an R cell in its most significant position and H/R cells therebetween. Cell 21-0 is responsive to the sum output of the corresponding H/R cell in the previous row (22-0), and R cell 22-3 is responsive to the carry output of the most significant H/R cell in the first row of subsection 20. Each H/R cell is connected to the sum output of a corresponding H/R cell in the previous row and to the carry output of an H/R cell in the previous row having a 1-bit lower significance. In each succeeding row in subsection 20, the number of R cells at the low significant end of the row is increased by one at the expense of the number of H/R cells in the row, and the most significant bit cell is an O/R cell rather than an R cell.

The efficient operation of the FIG. 1 multiplier may be appreciated from the following example where the multiplicand x is 0101 (5) and the multiplier is 1011 (11). The multiplicand 0101 is gated by input $y_0$ (through A/R elements 11-8) causing a "1" input at R cell 12-0, a "0" input at cell 12-1, a "1" input at cell 12-2 and a "0" input at cell 12-3. Element 12-5, responsive to multiplier bit $y_1$, also gates input 0101 to the first row of subsection 10, yielding partial sum bits 0111 applied to cells 13-4 through 13-1, respectively, and carry bits 000 applied to cell 13-4 through 13-2, respectively. Element 13-6, responsive to $y_2=0$ adds nothing to the computations performed in the second row, yielding partial sum bits 001111 at the output of cells 13-5 through 13-0, respectively, and carry bits 000. In the last stage of subsection 10, element 14-7 in response to $y_3=1$ applies bits 0101 to cells 14-6 through 14-3, respectively. Those bits are added to the sum and carry outputs of the second row, yielding partial sum output bits 0100111 from cells 14-6 through 14-0, respectively, and carry output bits 001 from cells 14-5 through 14-3, respectively.

The four least significant sum bits at the output of subsection 10 (0111) are applied to subsection 30, wherein following a four-stage delay they are transferred to the output of subsection 30. The three most significant sum bits at the output of subsection 10, together with the carry bit outputs of subsection 10, are applied, as described above, to subsection 20. The sum output of the first row within subsection 20 is 011 from cells 21-2 through 21-0, respectively, and the carry bits are all zero. Because of the zeros in the carry bits, the 011 output propagates unaltered to the output of subsection 20, yielding a final result, developed from a concatenation of section 20 and 30 outputs, of 00110111 (55).

The multiplier of FIG. 1 effectively multiplies positive numbers. Signed numbers, expressed in 2's complement form for example, must be performed in a different manner. It is well known that a 2's complement representation of a negative number having n-1 magnitude bits can be expressed as the difference $$x = \left( 2^{N-1} x_{N-1} - \sum_{i=0}^{N-2} 2^i x_i \right) \quad (1)$$

With such a representation, a product can be specified by $$xy = \left( 2^{(N-1)} x_{N-1} - \sum_{i=0}^{N-2} 2^i x_i \right)\left( 2^{N-1} y_{N-1} - \sum_{j=0}^{N-2} 2^j y_j \right) \quad (2)$$

which expands to $$xy = \sum_{i=0}^{N-2} \sum_{j=0}^{N-2} x_i y_j 2^{i+j} + 2^{2N-2} x_{N-1} y_{N-1} - 2^{N-1} x_{N-1} \sum_{j=0}^{N-2} 2^j y_j - 2^{N-1} y_{N-1} \sum_{i=0}^{N-2} 2^i x_i. \quad (3)$$

The array below shows the partial product terms called for by the term making up equation (3)(for N=3). The first three rows correspond to the first term of equation (2), the fourth row corresponds to the second term, the fifth and seventh rows correspond to the third term expessed in 2's complement form, and the sixth and eighth rows correspond to the last term of equation (3).

|   |   |   |   |   | $y_3$ | $y_2$ | $y_1$ | $y_0$ |
|---|---|---|---|---|---|---|---|---|
|   |   |   |   |   | $x_3$ | $x_2$ | $x_1$ | $x_0$ |
|   |   |   |   |   |   | $x_0y_2$ | $x_0y_1$ | $x_0y_0$ |
|   |   |   |   |   | $x_1y_2$ | $x_1y_1$ | $x_1y_0$ | 0 |
|   |   |   |   | $x_2y_2$ | $x_2y_1$ | $x_2y_0$ | 0 | 0 |
| 0 | $x_3y_3$ | 0 | 0 | 0 | 0 | 0 | 0 |
| 1 | 1 | $\overline{x_3y_2}$ | $\overline{x_3y_1}$ | $\overline{x_3y_0}$ | 1 | 1 | 1 |
| 1 | 1 | $\overline{x_2y_3}$ | $\overline{x_1y_3}$ | $\overline{x_0y_3}$ | 1 | 1 | 1 |
| 0 | 0 | 0 | 0 | 0 | 0 | 0 | 0 |
| 0 | 0 | 0 | 0 | 0 | 0 | 0 | 1 |

A reorganization of the above yields the array of partial product terms depicted below.

|   |   | $\overline{x_0y_3}$ | $x_0y_2$ | $x_0y_1$ | $x_0y_0$ |
|---|---|---|---|---|---|
|   | $\overline{x_1y_3}$ | $x_1y_2$ | $x_1y_1$ | $x_1y_0$ |   |
| $\overline{x_2y_3}$ | $x_2y_2$ | $x_2y_1$ | $x_2y_0$ |   |   |
| 1 | $x_3y_3$ | $\overline{x_3y_2}$ | $\overline{x_3y_1}$ | $\overline{x_3y_0}$ |   |
|   | 1 |   |   |   |   |

The above arrangement of terms is identical to the arrangement of terms that gives rise to the structure of FIG. 1 for multiplying two positive integers, except for the inverted terms and the two "1" terms. To realize this structure, the inverted terms are obtained by modifying the four cell A/R elements, the "1" at the most significant bit position is accounted for by providing the inverse of the carry output of the previous full adder cell on that row, and the "1" at the lower significance is accounted for by replacing H/R cell 21-0 with a F/R cell. More specifically, with respect to the inverted terms, the inverted term in the most significant bit position in rows other than the last is obtained by employing a NAND gate instead of an AND gate. In FIG. 1, for example, cells 11-0, 11-1 and 11-2 are AND gates whereas cell 11-3 is a NAND gate. For the last row (element 14-7) the situation is reversed, with the most significant cell being an AND gate and lower significance cells being a NAND gate.

A perusal of the FIG. 1 realization reveals that the pipeline adder of this invention is faster than is necessary. Subsection 10 contains full adders which require two cascaded logic gates, whereas the half adders in subsection 20 require a single level of logic gates. Consequently, some economies (e.g., lower latency) can be realized in subsection 20 by going through two rows of the adder pipeline before reclocking. The resulting cell structure includes three inputs and three outputs as shown in FIG. 2.

Figure 2:
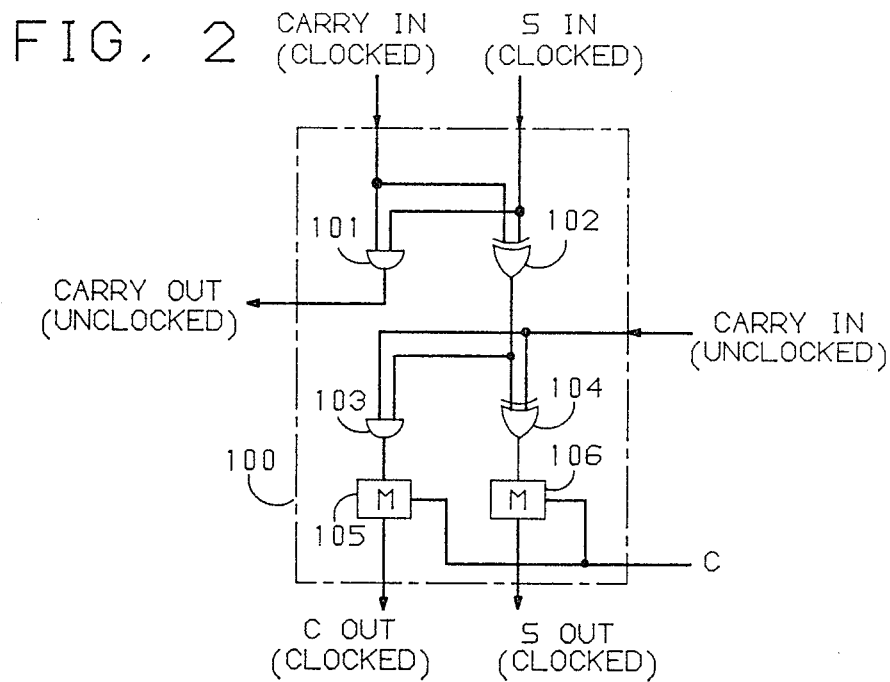
FIG. 2 depicts an adder cell that is responsive to a clocked sum input bit, a clocked carry input bit, and a second, unclocked, carry input bit.
Figure 3:
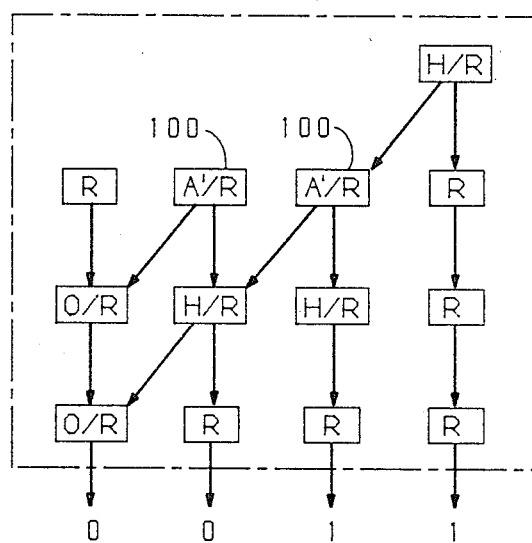
FIG. 3 shows the pipeline adder of FIG. 1 which employs the adder cells of FIG. 4.

Cell 100 in FIG. 2 is responsive to clocked sum and carry inputs and to an unclocked carry input. The clocked inputs are combined in AND gate 101 to develop an unclocked carry output and in Exclusive OR gate 102 to develop an internal, unclocked, sum signal. The unclocked carry input signal is combined with the internal sum signal in AND gate 103 to develop a second carry signal and in exclusive OR gate 104 to develop a second sum signal. The second carry and sum signals are clocked in memory elements 105 and 106 to develop clocked carry out and sum signals, respectively. The pipeline adder of FIG. 1, employing cells 100 where possible (designated A'/R), is depicted in FIG. 3. for purposes of illustration, FIG. 1 was selected to be a 4-bit multiplier and, consequently, the savings resulting from the use of cells 100 in FIG. 3 do not appear to be substantial. It should be realized of course that with a 16-bit or, perhaps, a 32-bit multiplier, the savings are quite measurable.

In CMOS VLSI realizations, it turns out that efficient adder designs first develop the inverse of the sum and carry signals and then invert those signals to obtain the true sum and carry signals. Examples of this approach are found in *Principles of CMOS VLSI Design, A Systems Perspective*, Addison Wesley, FIGS. 8.4, 8.12, and others. For purposes of the FIG. 1 multiplier, however, there is no need to employ the true sum and carry outputs. In fact, operating with inverse signals merely results in an inverted output and, therefore, the product is mathematically correct when the number of adder rows stages is even. With an odd number of adder rows, an inverter row must be appended at the last stage of the multiplier. This speed (and IC size) improvement is realized with a structure that is identical to that of FIG. 1, with the exception that each H/R and F/R cell develops the inverse of the sum and carry signals.

Figure 4:
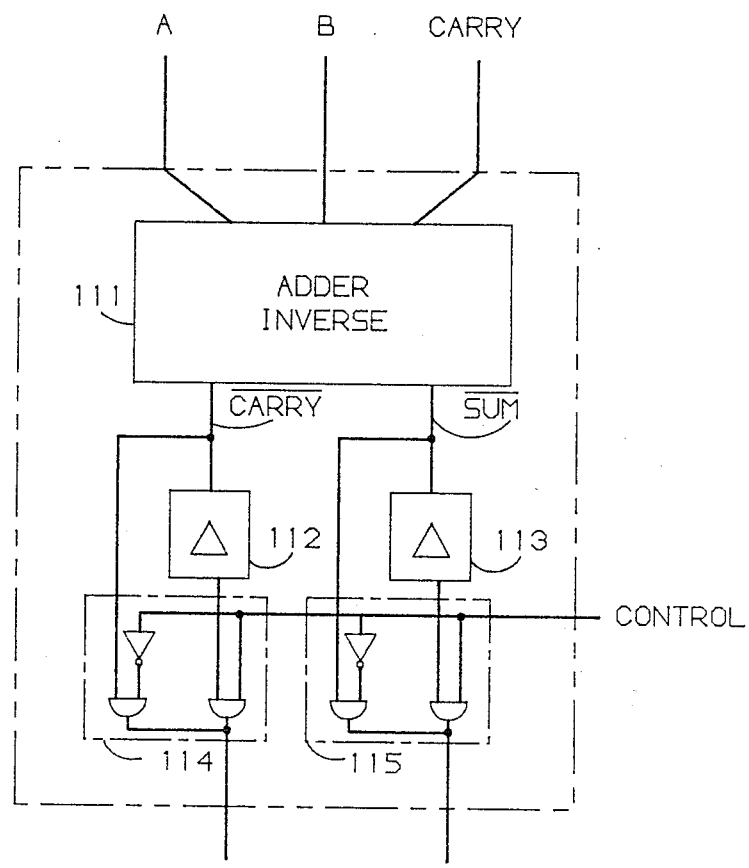
FIG. 4 illustrates an adder cell with means to circumvent the clocking within the cell.

With some of the improvements described above, a multiplier in accordance with the principles of our invention has been successfully tested at multiplication rates of up to 70 MHz. This is a very high throughput, but the structure does impose a latency on the output because the data is registered (and hence delayed) at each row. In some applications, however, there is a need to control latency, as when there is a need to synchronize the output of the pipeline multiplier with signals derived from other arithmetic elements or memories. In such applications, when the circuit's operating frequency is below the maximum capability of the multiplier, latency can be reduced and synchronization with other circuit elements can be improved by dispensing with the reclocking at some, selected, rows of the multiplier. A circuit design that incorporates this enhancement is shown in FIG. 4. As depicted in FIG. 4, and F/R adder cell 110 comprises an arithmetic logic element 111 which develops the sum inverse and the carry inverse, a 1-bit register for each of the arithmetic logic element outputs (112 and 113) and a selection gate for each register (114 and 115). Each selection gate effectively is a single-pole double-throw switch that is responsive to the output of the arithmetic logic element, to the 1-bit register, and to a control signal that determines whether the output of the arithmetic logic element is to be registered or not.

Figure 5:
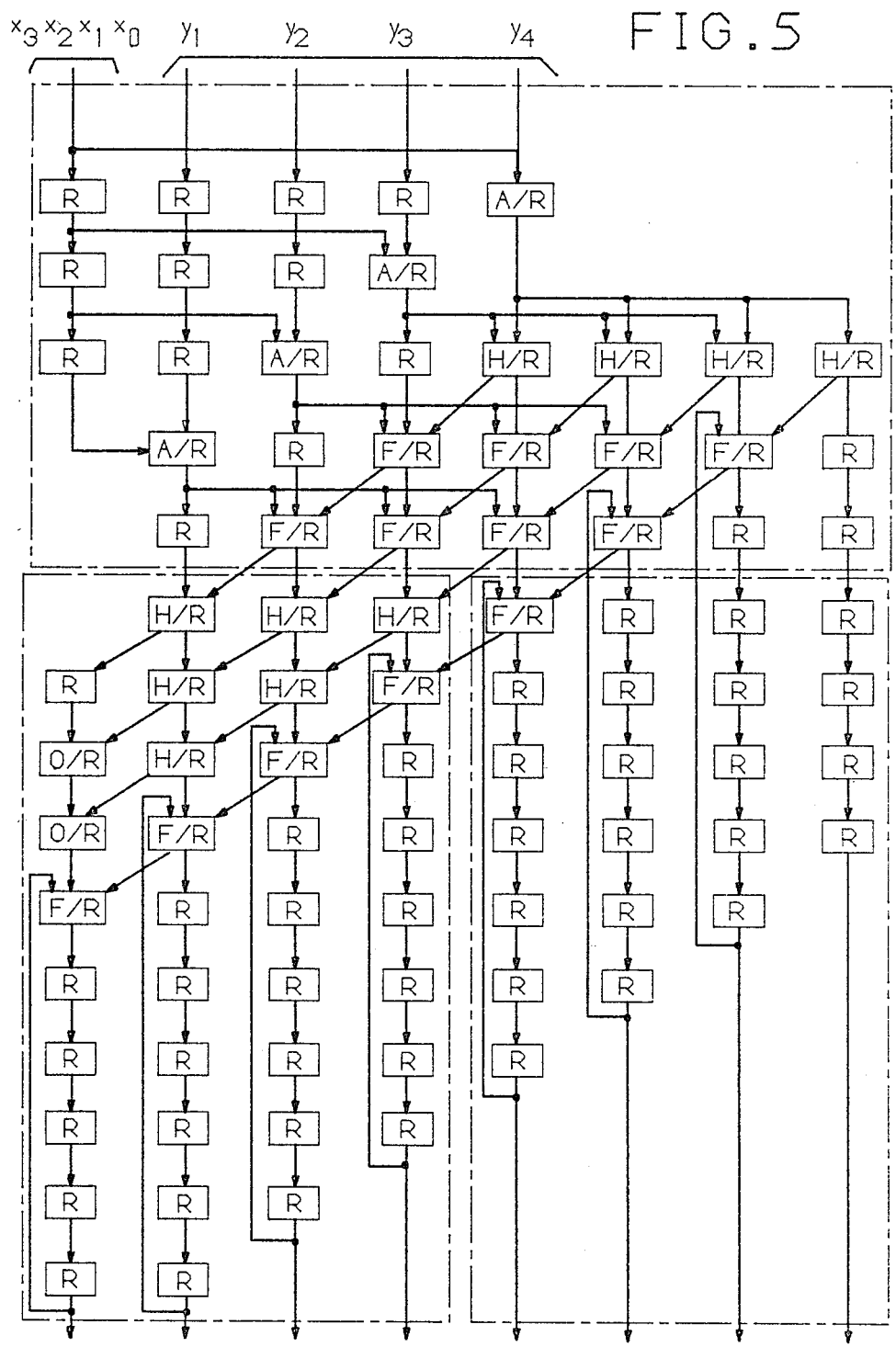
FIG. 5 depicts a pipeline adder arranged to provide a plurality of accumulated sums.

The FIG. 1 pipeline adder permits a still additional enhancement to the multiplier. By replacing diagonal cells 12-0, 13-1, 14-2, 31-3, 22-0, 23-1, and 24-2 with appropriate adder cells and providing access to the newly acquired inputs permits other input signals to be added to the ultimate product. An additional row must, of course, be added to the FIG. 1 structure with register cells in all but the most significant cell, which should be an F/R cell. In other words, a signal representative of A, where $$A = X \cdot Y + Z \qquad (4)$$

can easily be developed. Indeed, by feeding the product output of the multiplier back to the newly acquired inputs of subsection 20 (with the addition of appropriate delay), a multi-channel multiplier-accumulator is formed. This structure is shown in FIG. 5. With P pipeline registered stages in subsection 20, at any one time P different partial products are contained in subsection 20, and P accumulated products may be developed in accordance with the equation.

$$F(i) = \sum_{j=0}^{M} x(i + jP) \cdot y(i + jP) \quad i = 0,1,2, \ldots (P - 1) \qquad (5)$$

where M is the number of input samples applied to the multiplier, divided by P, F(i) refers to the ith output of the multiply accumulate module, and $x(i+jP)$ and $y(i+jP)$ are the $(i+jP)$th samples of the input sequences x and y, respectively. It should be understood, however, that $i=0$ occurs after the first P clock periods (accounting for the latency in the circuit). Such a multiplier accumulator, shown in FIG. 5, is particularly useful for multi-channel FIR filtering and pipelined DFT processing applications.

Although only a number of particular implementations have been described, it is understood that other embodiments may be had which incorporate the principles of our invention. For example, the multiplier described performs multiplication of two numbers of N bits each, but clearly it can be applied to the multiplication of numbers having different number of bits. Also, the multiplier accumulator shown in FIG. 5 can easily be modified to incorporate powers of 2 multiplications (shifts) in the signal being fed back. Other variations are also possible.

What is claimed is:

1. A pipeline adder for developing a sum of two numbers having M bits each, where M is a number, comprising:
   a plurality of cells arranged in rows and columns, with each cell operating on data signal related to said two numbers to develop output data signals related to said two numbers, with the first row of cells being responsive to said two numbers, each subsequent row of cells being responsive to developed data signals emanating solely from the immediately previous row of cells, and the last row of cells developing said sum of said two numbers;
   N-1 least significant cells in each of said rows providing a preselected delay, N being a number, and M-N+1 next higher significance cells in each of said rows performing arithmetic addition, where N is the row number beginning with 1;
   each of said higher significance cells that perform arithmetic addition in rows other than the first row having a sum input connected to a sum signal output developed by a cell in the same column and in the immediately preceding row, and having a carry input connected to a carry signal output developed by a cell in a column of one bit lower significance and in the immediately preceding row, with each of said higher significance cells that perform arithmetic addition developing a binary sum signal output responsive to its inputs and a carry signal output responsive to its inputs; and
   the most significant cell in the third and each subsequent of said rows, responsive to an output signal of a most significant cell in the immediately previous row and the same column and to a carry signal from an arithmetic addition cell in said immediately previous row and in a column of one bit lower significance, developing a cell output signal in accordance with the OR function of said cell's input signals.

2. The adder of claim 1 wherein said cells include means for reclocking output signals of said cells.

3. The adder of claim 1 wherein said cells that perform arithmetic addition are half adders.

4. The adder of claim 1 wherein cells in selected ones of said rows include means for reclocking signals of said cells.

5. The adder of claim 1 wherein said cells include means for reclocking, and cells in at least one of said rows include means for excluding said means for reclocking from the signal path of said cells.

6. The adder of claim 1 wherein said cells include means for reclocking, and cells in at least one of said rows include switch means for bypassing said means for reclocking.

7. The adder of claim 1 wherein some of said arithmetic addition cells comprise a clocked sum input, a clocked carry input, a clocked sum output, a clocked carry output, an unclocked sum output, and an unclocked carry output,
   with said clocked sum output developed in accordance with the exclusive OR function of said unclocked carry input with an exclusive OR function of said clocked sum input and said clocked carry input,
   with said clocked carry output developed in accordance with the AND function of said exclusive OR of said clocked sum input and said clocked carry input with said unclocked carry input, and
   with said unclocked carry output developed in accordance with the AND function of said clocked sum input and said clocked carry input.

8. The adder of claim 1 wherein cells of every other one of said rows include means for reclocking signals of said cells and cells of other ones of said rows are unclocked.

9. A pipeline adder for developing a sum of two numbers having M bits each, where M is a number, comprising:
   a plurality of cells arranged in rows and columns, with each cell operating on data signals related to said two numbers to develop output data signals related to said two numbers, with the first row of cells being responsive to said two numbers, each subsequent row of cells being responsive to developed data signals emanating solely from the immediately previous row of cells, and the last row of cells developing said sum of said two numbers;
   N-1 least significant cells in each of said rows providing a preselected delay and signal inversion, N being a number, and M-N+1 next higher significance cells, in each of said rows performing arithmetic addition, where N is the row number beginning with 1;
   each of said higher significance cells that perform arithmetic addition in rows other than the first row having a sum input connected to a sum inverse signal output developed by a cell in the same column and in the immediately preceding row, and having a carry input connected to a carry inverse signal output developed by a cell in a column of one bit lower significance and in the immediately preceding row, with each of said higher significance arithmetic addition cells developing a sum inverse signal output equal to the Exclusive NOR function of said sum input and said carry inputs, and a carry inverse signal output equal to the NAND function of said sum inputs and said at least one carry input; and
   the most significant cell in the third and each subsequent of said rows, responsive to an output signal of a most significant cell in the immediately previous row and the same column and to a carry inverse signal from an arithmetic addition cell in said immediately previous row and in a column of one bit lower significance, developing a cell output signal in accordance with the NOR function of said cell's input signals.

10. An arithmetic unit for multiplying signals having M bits each where M is a number, and developing a product signal, comprising:
    an M bit pipeline para-multiplier subsection developing 2M-1 sum output signals and M-1 carry output signals having a plurality of rows, and a plurality of cells within each row, with each of said cells in a row developing a sum signal corresponding to the inverse of the arithmetic sum of the cell's inputs and a carry inverse signal corresponding to the inverse of the arithmetic carry of the cell's inputs, said sum signal and said carry signal of a cell in one row being connected to cells in the same following row;
    a delay section having M inputs and M outputs, responsive to a clock and to M least significant sum output signals of said pipeline multiplier, and imposing a delay of M clock pulses between signals at said M inputs and corresponding signals at said M outputs; and
    a pipeline adder section connected to M-1 most significant of said sum signals and to said M-1 carry output signals and developing the most significant portion.

11. An arithmetic unit for multiplying signals having M bits each where M is a number, and developing a product signal, comprising:
    an M bit pipeline para-multiplier subsection developing 2M-1 sum output signals and M-1 carry output signals having a plurality of rows, and a plurality of cells within each row, with each of said cells in a row developing a sum signal corresponding to the inverse of the arithmetic sum of the cell's inputs and a carry inverse signal corresponding to the inverse of the arithmetic carry of the cell's inputs, said sum signal and said carry signal of a cell in one row being connected to cells in the same following row;
    a delay section having M inputs and M outputs, responsive to a clock and to M least significant sum output signals of said pipeline multiplier, and imposing a delay of M clock pulses between signals at said M inputs and corresponding signals at said M outputs; and
    a pipeline adder section connected to M-1 most significant of said sum signals and to said M-1 carry output signals and developing the most significant portion;
    wherein said pipeline adder section further comprises:
    a plurality of cells arranged in rows and columns, with each cell operating on data signals related to said two numbers to develop output data signals related to said two numbers, with the first row of cells being responsive to said two numbers, each subsequent row of cells being responsive to developed data signals emanating solely from the immediately previous row of cells, and the last row of cells developing said sum of said two numbers;
    N-1 least significant cells in each of said rows providing a preselected delay, N being a number, and M-N+1 next higher significance cells in each of said rows performing arithmetic addition and signal inversion, where N is the row number beginning with 1;
    each of said higher significance cells that perform arithmetic addition in rows other than the first row having a sum input connected to a sum signal output developed by a cell in the same column and in the immediately preceding row, and having a carry input connected to a carry signal output developed by a cell in a column of one bit lower significance and in the immediately preceding row, with each of said higher significance arithmetic addition cells developing a sum signal output equal to the Exclusive OR function of said sum input and said carry inputs, and a carry signal output equal to the AND function of said sum inputs and said at least one carry input; and the most significant cell in the third and each subsequent of said rows responsive to an output signal of a most significant cell in the immediately previous row and the same column and to a carry signal from an arithmetic addition cell in said immediately previous row and in a column of one bit lower significance, developing a cell output signal in accordance with the OR function of said cell's input signals.

12. An arithmetic unit for multiplying signals having M bits each where M is a number, and developing a product signal, comprising:

an M bit pipeline para-multiplier subsection developing 2M-1 sum output signals and M-1 carry output signals having a plurality of rows, and a plurality of cells within each row, with each of said cells in a row developing a sum signal corresponding to the inverse of the arithmetic sum of the cell's inputs and a carry inverse signal corresponding to the inverse of the arithmetic carry of the cell's inputs, said sum signal and said carry signal of a cell in one row being connected to cells in the same following row;

a delay section having M inputs and M outputs, responsive to a clock and to M least significant sum output signals of said pipeline multiplier, and imposing a delay of M clock pulses between signals at said M inputs and corresponding signals at said M outputs; and a pipeline adder section connected to M-1 most significant of said sum signals and to said M-1 carry output signals and developing the most significant portion;

wherein said pipeline multiplier further comprises delay cells, half adder cells and full adder cells arranged in rows, with each of said delay, half adder and full adder cells including means for reclocking the output signals of said cells and with each of said delay, half adder and full adder cells in at least one of said rows including switch means responsive to a control signal for excluding said means for reclocking from the signal path of said output signals of said cells.

13. An arithmetic unit for multiplying signals having M bits each where M is a number, and developing a product signal, comprising:

an M bit pipeline para-multiplier subsection developing 2M-1 sum output signals and M-1 carry output signals having a plurality of rows, and a plurality of cells within each row, with each of said cells in a row developing a sum signal corresponding to the inverse of the arithmetic sum of the cell's inputs and a carry inverse signal corresponding to the inverse of the arithmetic carry of the cell's inputs, said sum signal and said carry signal of a cell in one row being connected to cells in the same following row;

a delay section having M inputs and M outputs, responsive to a clock and to M least significant sum output signals of said pipeline multiplier, and imposing a delay of M clock pulses between signals at said M inputs and corresponding signals at said M outputs; and a pipeline adder section connected to M-1 most significant of said sum signals and to said M-1 carry output signals and developing the most significant portion;

wherein said pipeline adder section and said delay section comprise rows of cells including means for reclocking the output signals of said cells, and switch means included in cells of at least one of said rows, responsive to a control signal, for bypassing said means for reclocking.

14. An arithmetic unit for multiplying signals having M bits each where M is a number, and developing a product signal, comprising:

an M bit pipeline para-multiplier subsection developing 2M-1 sum output signals and M-1 carry output signals having a plurality of rows, and a plurality of cells within each row, with each of said cells in a row developing a sum signal corresponding to the inverse of the arithmetic sum of the cell's inputs and a carry inverse signal corresponding to the inverse of the arithmetic carry of the cell's inputs, said sum signal and said carry signal of a cell in one row being connected to cells in the same following row;

a delay section having M inputs and M outputs, responsive to a clock and to M least significant sum output signals of said pipeline multiplier, and imposing a delay of M clock pulses between signals at said M inputs and corresponding signals at said M outputs; and a pipeline adder section connected to M-1 most significant of said sum signals and to said M-1 carry output signals and developing the most significant portion;

wherein said pipeline adder section further comprises:

a plurality of cells arranged in rows and columns;

N-1 least significant cells in each of said rows providing a preselected delay and signal inversion, and M-N+1 next higher significance cells in each of said rows performing arithmetic addition and signal inversion, where N is the row number beginning with 1;

each of said higher significance cells that perform arithmetic addition in rows other than the first row having a sum input connected to a sum inverse signal output developed by a cell in the same column and in the immediately preceding row, and having a carry input connected to a carry inverse signal output developed by a cell in a column of one bit lower significance and in the immediately preceding row, with each of said higher significance cells that perform arithmetic addition developing a sum inverse signal output equal to the Exclusive NOR function of said sum input and carry inputs, and a carry inverse signal output equal to the NAND function of said sum inputs and said carry input; and the most significant cell in the third and each subsequent of said rows responsive to an output signal of a most significant cell in the immediately previous row and the same column and to carry signal from an arithmetic addition cell in said immediately previous row and in a column of one bit lower significance, developing a cell output signal in accordance with the NOR function of said cell's input signals.

15. A pipeline multiplier for developing a product of a multiplicand having M bits and a multiplier having N bits, M and N each being a number, comprising:
   a para-multiplication section of N-1 rows, all but the first of said rows being responsive to a partial product signal from the immediately previous row and to said multiplier, said partial product signals containing a plurality of sum signals and a plurality of carry signals;
   a delay section responsive to N-1 least significant ones of the sum signals on the partial product signal of the last of said rows, for delaying said N-1 least significant ones of said partial sum output signals; and
   a pipeline adder section responsive to remaining ones of said sum signals and to said carry signals the sum signals on the partial product signal of the last of said rows for combining said remaining ones of said partial sum output signals with said partial carry output signals.

16. The multiplier of claim 15 wherein each row on said para-multiplication section is responsive to signals developed by the immediately preceding row in said para-multiplication section and to a signal corresponding to said multiplicand ANDed with a selected bit of said multiplier.

17. The multiplier of claim 15 wherein said multiplier possesses bits $x_0, x_1, x_2, \ldots x_{N-1}$, said multiplicand possesses bits $y_0, y_1, y_2, \ldots y_{M-1}$, the first row of said para-multiplication section is responsive to a signal corresponding to said multiplicand ANDed with bit $x_0$ of said multiplier and to a signal corresponding to said multiplicand ANDed with bit $x_1$ of said multiplier, and each subsequent row j is responsive to signals developed by row j-1 and to a signal corresponding to said multiplicand ANDed with bit $x_j$ of said multiplier.

18. A pipeline multiplier for developing a product of a multiplicand having M bits and a multiplier having N bits, M and N each being a number comprising:
   a para-multiplication section of N-1 rows, all but the first of said rows being responsive to a partial product signal from the immediately previous row and to said multiplier, said partial product signals containing a plurality of sum signals and a plurality of carry signals;
   a delay section responsive to N-1 least significant ones of the sum signals on the partial product signal of the last of said rows, for delaying said N-1 least significant ones of said partial sum output signals;
   a pipeline adder section responsive to remaining ones of said sum signals and to said carry signals the sum signals on the partial product signal of the last of said rows for combining said remaining ones of said partial sum output signals with said partial carry output signals;
   wherein said multiplier possesses bit $x_0, x_1, x_2, \ldots x_{N-1}$, said multiplicand possesses bits $y_0, y_1, y_2, \ldots y_{M-1}$, the first row of said para-multiplication section is responsive to a signal corresponding to said multiplicand ANDed with bit $x_0$ of said multiplier and to a signal corresponding to said multiplicand ANDed with bit $x_1$ of said multiplier, and each subsequent row j is responsive to signals developed by row j-1 and to a signal corresponding to said multiplicand ANDed with bit $x_j$ of said multiplier; and
   means for inverting the ANDed results of bit $y_{M-1}$ with bits $x_i$, where $i=0,1,2,\ldots N-2$ and for inverting the ANDed results of bits $y_k$, where $k=0,1,2,\ldots M-2$, with bit $x_{N-1}$, with respect to ANDed results of other bits $y_k$ with bits $x_i$.

19. A pipeline multiplier for developing a product of a multiplicand having M bits and a multiplier having N bits, M and N each being a number, comprising:
   a para-multiplication section of N-1 rows, all but the first of said rows being responsive to a partial product signal from the immediately previous row and to said multiplier, said partial product signals containing a plurality of sum signals and a plurality of carry signals;
   a delay section responsive to N-1 least significant ones of the sum signals on the partial product signal of the last of said rows, for delaying said N-1 least significant ones of said partial sum output signals; and
   a pipeline adder section responsive to remaining ones of said sum signals and to said carry signals the sum signals on the partial product signal of the last of said rows for combining said remaining ones of said partial sum output signals with said partial carry output signals;
   wherein said multiplier possesses bits $x_0, x_1, x_2, \ldots x_{N-1}$, said multiplicand possesses bits $y_0, y_1, y_2, \ldots y_{M-1}$, the first row of said para-multiplication section is responsive to a signal corresponding to said multiplicand ANDed with bit $x_0$ of said multiplier and to a signal corresponding to said multiplicand ANDed with bit $x_1$ of said multiplier, and each subsequent row j is responsive to signals developed by row j-1 and to a signal corresponding to said multiplicand ANDed with bit $x_j$ of said multiplier; and
   wherein said delay section and said pipeline adder section include a preselected number of rows, and where each row j of said multiplier comprises cells $c_i$, where $i=0,1,2,\ldots$ and $c_0$ is the least significant cell, and each cell $c_i$ of row $j\neq 0$ where $j=0$ represents the first row receives signals from cell $c_i$ or cell $c_{i\text{-}1}$, or both cells $c_i$ and $c_{i\text{-}1}$ of row $j+1$, and each cell $c_i$ of row j other than the last row of said multiplier provided signals to cell $c_i$ of row $j+1$.

20. The multiplier of claim 19 wherein for a preselected value of j, cell $c_{i-j}$ of row $i=j, j+1, j+2, \ldots$ is an adder cell that provides an input port to an external signal $z_{i-j}$.

21. A recursive pipeline adder for developing an accumulated sum numbers having M bits each, where M is a number comprising:
   a plurality of cells arranged in rows and columns, with the first row of cells being responsive to said two numbers, the next M+1 rows of cells having one cell in each column being responsive to developed data signals emanating the row immediately preceding said cell and from the output of said recursive adder at said column, and having the remaining cells in the row responsive to developed data signals emanating solely from the immediately previous row of cells.

22. An arithmetic unit for multiplying signals having M bits each where M is a number, and developing a product signal, comprising:

an M bit pipeline para-multiplier subsection developing 2M-1 sum output signals and M-1 carry output signals having a plurality of rows, and a plurality of cells within each row, with each of said cells in a row developing a sum signal corresponding to the inverse of the arithmetic sum of the cell's inputs and a carry inverse signal corresponding to the inverse of the arithmetic carry of the cell's inputs, said sum signal and said carry signal of a cell in one row being connected to cells in the same following row;

a delay section having M inputs and M outputs, responsive to a clock and to M least significant sum output signals of said pipeline multiplier, and imposing a delay of M clock pulses between signals at said M inputs and corresponding signals at said M outputs;

a pipeline adder section connected to M-1 most significant of said sum signals and to said M-1 carry output signals and developing the most significant portion; and wherein said cells in said para-multiplier section in one of said rows, i, are connected to cells in a subsequent one of said rows, i+1, where i is an integer, cells of every other row of said cells are clocked, and cells of remaining one of said rows of cells are unclocked.

* * * * *